US007656426B2

(12) United States Patent
Yamaya

(10) Patent No.: US 7,656,426 B2
(45) Date of Patent: Feb. 2, 2010

(54) DIGITAL CAMERA AND DATA TRANSFER METHOD FROM A RECORD MEDIUM

(75) Inventor: Kunihiko Yamaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 560 days.

(21) Appl. No.: 10/297,311

(22) PCT Filed: Apr. 5, 2002

(86) PCT No.: PCT/JP02/03426

§ 371 (c)(1),
(2), (4) Date: May 22, 2003

(87) PCT Pub. No.: WO02/084999

PCT Pub. Date: Oct. 24, 2002

(65) Prior Publication Data

US 2004/0109062 A1 Jun. 10, 2004

(30) Foreign Application Priority Data

| Apr. 6, 2001 | (JP) | 2001-109022 |
| Apr. 6, 2001 | (JP) | 2001-109024 |
| May 11, 2001 | (JP) | 2001-141702 |

(51) Int. Cl.
*H04N 5/225* (2006.01)
(52) U.S. Cl. .................. 348/207.1; 348/231.2
(58) Field of Classification Search .......... 710/52, 710/53, 56, 313; 348/333.05, 231.7, 231.3, 348/231.4, 231.2
See application file for complete search history.

(56) References Cited

U.S. PATENT DOCUMENTS

| 5,745,902 | A | * | 4/1998 | Miller et al. ................. 707/200 |
| 6,141,719 | A | * | 10/2000 | Rafferty et al. .............. 710/316 |
| 6,308,239 | B1 | * | 10/2001 | Osakada et al. ............. 710/316 |
| 6,381,666 | B1 | * | 4/2002 | Kejser et al. ................. 710/300 |
| 6,496,891 | B1 | * | 12/2002 | Cluff et al. ................... 710/260 |
| 6,538,698 | B1 | * | 3/2003 | Anderson .............. 348/333.05 |
| 6,564,275 | B1 | * | 5/2003 | Chen .......................... 710/107 |
| 6,721,001 | B1 | * | 4/2004 | Berstis ..................... 348/231.3 |
| 6,738,075 | B1 | * | 5/2004 | Torres et al. ................ 715/723 |

(Continued)

FOREIGN PATENT DOCUMENTS

JP 9-98367 4/1997

(Continued)

*Primary Examiner*—Jason Chan
*Assistant Examiner*—Usman Khan
(74) *Attorney, Agent, or Firm*—Frommer Lawrence & Haug LLP; William S. Frommer; Thomas F. Presson

(57) ABSTRACT

An operation input portion 7, a buffer memory 8, a record medium 9, and a single USB controller 10 are connected to a bus connected to a controlling microcomputer 6. A USB connector 11 is connected to the USB controller 10. The USB controller 10 as hardware deals with a single interface. By a process of the controlling microcomputer 6, data is transferred from the buffer memory 8 to the USB controller 10 through one of USB interfaces corresponding to PTP and mass storage class interface. With a switch of the operation input portion 7 and a menu screen, the user sets a USB interface. Selection information representing the selected USB interface is stored in a memory of the controlling microcomputer 6.

16 Claims, 19 Drawing Sheets

U.S. PATENT DOCUMENTS

| | | | |
|---|---|---|---|
| 2001/0027500 A1* | 10/2001 | Matsunaga | 710/104 |
| 2002/0051641 A1* | 5/2002 | Nagaoka | 396/429 |
| 2002/0116565 A1* | 8/2002 | Wang et al. | 710/313 |
| 2002/0141418 A1* | 10/2002 | Ben-Dor et al. | 370/398 |
| 2003/0169349 A1* | 9/2003 | Aoi et al. | 348/231.2 |

FOREIGN PATENT DOCUMENTS

| | | |
|---|---|---|
| JP | 2001-312791 | 12/1997 |
| JP | 2001-202325 | 7/2001 |
| JP | 2001-290753 | 10/2001 |

* cited by examiner

Fig. 6

| FILE NO. | FILE TYPE |
|---|---|
| 1 | 0 |
| 2 | 0 |
| 3 | 1 |
| 4 | 2 |
| 5 | 0 |
| ⋮ | ⋮ |
| n | 0 |

Fig. 9

| Rec MODE | | PTP (TRANSFERRED FILE) |
|---|---|---|
| NORMAL | ¥DCIM¥100MSDCF¥DSC00001.JPG | |
| E-MAIL | ¥DCIM¥100MSDCF¥DSC00002.JPG | ¥DCIM¥MSSONY¥IMCIF100¥DSC00002.JPG |
| VOICE MEMO | ¥DCIM¥100MSDCF¥DSC00003.JPG | ¥DCIM¥MSSONY¥MMOMLV100¥DSC00003.MPG |
| TIFF | ¥DCIM¥MSSONY¥IMCIF100¥DSC00004.TIF | |
| MOVIE | ¥MSSONY¥MOML0001¥MOV00005.MPG | |
| TEXT | ¥DCIM¥100MSDCF¥TXT000006.GIF | |
| CLIP MOTION (NORMAL) | ¥DCIM¥100MSDCF¥CLP00007.GIF | |
| CLIP MOTION (MOBILE) | ¥DCIM¥100MSDCF¥MBL00008.GIF | |

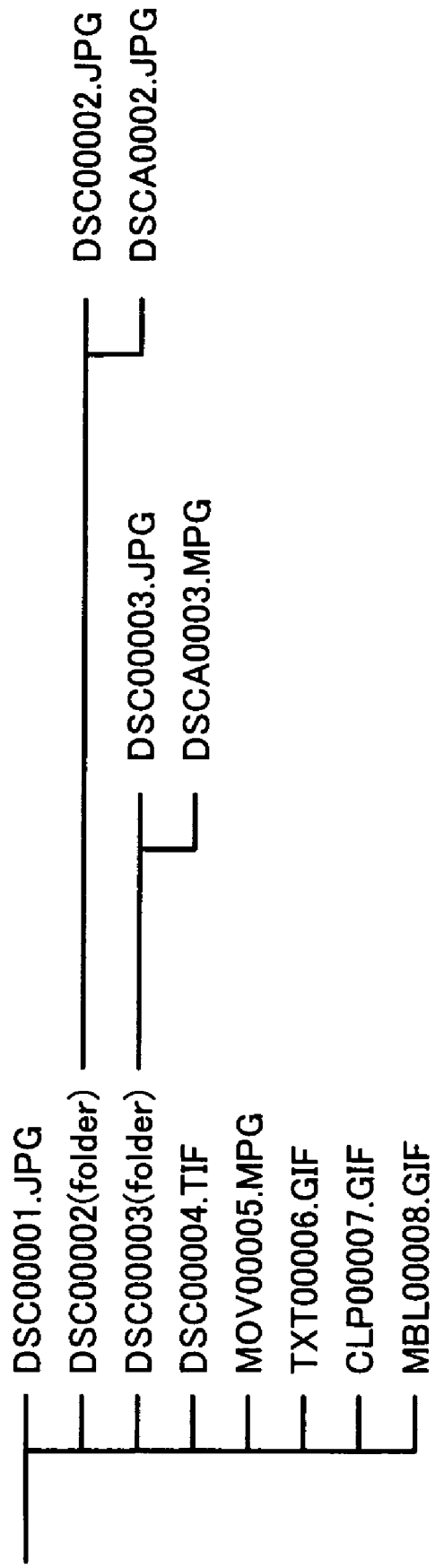

Fig. 11

| | |
|---|---|
| GetDeviceInfo | OBTAIN DEVICE (CAMERA) INFORMATION (CORRESPONDING OPERATION, CORRESPONDING EVENT, PICTURE FORMAT, ...). |
| OpenSession | START SESSION. ISSUE SESSION ID. |
| CloseSession | END SESSION. |
| GetStorageIDs | OBTAIN STORAGE ID (NUMBER OF STORAGES OF ONE DEVICE). |
| GetStorageInfo | OBTAIN STORAGE INFORMATION (MEDIUM CAPACITY, UNUSED CAPACITY, LOCK ON/OFF). |
| GetNumObjects | OBTAIN NUMBER OF PICTURE FILES. |
| GetObjectHandles | OBTAIN PICTURE FILE NO. |
| GetObjectInfo | OBTAIN PICTURE FILE INFORMATION (PICTURE FORMAT, PROTECT INFORMATION, FILE CAPACITY/SIZE, THUMBNAIL CAPACITY/SIZE, FILE NAME, DATE TIME). |
| GetObject | OBTAIN PICTURE. |
| GetThumb | OBTAIN THUMBNAIL. |

Fig. 19

GetObjectHandles Data

| | | |
|---|---|---|
| 0 | Countainer Length | 14h |
| 1 | | 00h |
| 2 | | 00h |
| 3 | | 00h |
| 4 | Countainer Type | 02h |
| 5 | | 00h |
| 6 | Code | 07h |
| 7 | | 10h |
| 8 | Transaction ID | |
| 9 | | |
| 10 | | |
| 11 | | |
| 12 | NumElements | 0nh |
| 13 | TOTAL NUMBER OF | 00h |
| 14 | ObjectHandle | 00h |
| 15 | | 00h |
| 16 | Entry | 01h |
| 17 | | 00h |
| 18 | | 00h |
| 19 | | 00h |
| | | • |
| | | 0nh |
| | | 00h |
| | | 00h |
| | | 00h |

Fig. 20

GetObjectInfo Data

| | | | | | | | | |
|---|---|---|---|---|---|---|---|---|
| 0 | Countainer Length | | | | 7Eh | | | |
| 1 | | | | | 00h | | | |
| 2 | | | | | 00h | | | |
| 3 | | | | | 00h | | | |
| 4 | Countainer Type | | | | 02h | | | |
| 5 | | | | | 00h | | | |
| 6 | Code | | | | 08h | | | |
| 7 | | | | | 10h | | | |
| 8 | Transaction ID | | | | | | | |
| 9 | | | | | | | | |
| 10 | | | | | | | | |
| 11 | | | | | | | | |
| 12 | StorageID | | | | 01h | | | |
| 13 | | | | | 00h | | | |
| 14 | | | | | 01h | | | |
| 15 | | | | | 00h | | | |
| 16 | ObjectFormat | | | 0x3000 | Undefined | | | |
| 17 | | | | 0x300B | MPEG | | | |
| | | | | 0x3801 | EXIF | | | |
| | | | | 0x3807 | GIF | | | |
| | | | | 0x3001 | Association | | | |
| 18 | ProtectionStatus | | | 0x0000 | No Protection | | | |
| 19 | | | | 0x0001 | Read-Only | | | |
| 20 | ObjectCompressedSize | | | | | | | |
| 21 | | | | | | | | |
| 22 | | | | | | | | |
| 23 | | | | | | | | |
| 24 | ThumbFormat | | | 0x0000 | None | | | |
| 25 | | | | 0x3808 | JFIF | | | |
| 26 | ThumbCompressed | | | | | | | |
| 27 | Size | | | 0x00001200 | | | | |
| 28 | | | | | | | | |
| 29 | | | | | | | | |
| 30 | ThumPixWidth | | | | | | | |
| 31 | | | | 0x000000A0 | | | | |
| 32 | | | | | | | | |

*Fig. 21*

| 33 | | |
|---|---|---|
| 34 | ThumbPixHeight | |
| 35 | | 0x00000078 |
| 36 | | |
| 37 | | |
| 38 | ImagePixWidth | 00h |
| 39 | | 00h |
| 40 | | 00h |
| 41 | | 00h |
| 42 | ImagePixHeight | 00h |
| 43 | | 00h |
| 44 | | 00h |
| 45 | | 00h |
| 46 | ImageBitDepth | 00h |
| 47 | | 00h |
| 48 | | 00h |
| 49 | | 00h |
| 50 | ParentObject | 00h |
| 51 | | 00h |
| 52 | | 00h |
| 53 | | 00h |
| 54 | AssociationType | 0x0000 |
| 55 | | 0x0001 Folder |
| 56 | AssociationDesc | 00h |
| 57 | | 00h |
| 58 | | 00h |
| 59 | | 00h |
| 60 | SequenceNumber | 00h |
| 61 | | 00h |
| 62 | | 00h |
| 63 | | 00h |
| 64 | Filename | 0Dh |
| 65 | Strings | |
| 90 | | |
| 91 | CaptureDate | 10h |
| 92 | Strings | |
| 123 | | |
| 124 | ModificationDate Strings | 00h |
| 125 | Keywords | 00h |

DIGITAL CAMERA AND DATA TRANSFER METHOD FROM A RECORD MEDIUM

TECHNICAL FIELD

The present invention relates to a digital camera that selectively uses a plurality of USB (Universal Serial Bus) connections and to a data transferring method for transferring data from the digital camera to a host such as a personal computer.

BACKGROUND ART

The USB is an interface that is used to connect a personal computer to a peripheral device. The USB has been almost substituted for the conventional serial port and parallel port. The USB has been used as an interface through which digital data such as a still picture and a low bit rate moving picture photographed by a digital camera is transferred to a personal computer. Generally, in the digital camera, photographed picture data is recorded to a removable storage medium such as a memory card.

In the case that a picture file recorded in the memory card of the digital camera is transferred to the personal computer, if the digital camera has a USB port, when the digital camera is directly connected to the personal computer through a USB cable, the picture file recorded in the memory card can be transferred from the digital camera to the personal computer.

As USB interface's standards for digital cameras, there are standards with respect to mass storage class interface and still image class interface. Through the mass storage class interface, a personal computer recognizes a digital camera as a removable medium. Through the still image class interface, the personal computer recognizes a digital camera as a scanner. Thus, depending on how a personal computer recognizes a device, there are two different classes. The mass storage class interface is prescribed in "Universal Serial Bus Mass Storage Class Specification Overview (Revision 1.1 Jun. 28, 2000)".

So far, a camera that can use both the interfaces at a time or select one of them has not been released. This is because it was considered that there was no need to provide a camera that deals with both the classes. In addition, when a camera deals with only a single USB interface, the cost and circuit scale thereof can be reduced. In contrast, personal computers can deal with any class. A device driver corresponding to a class of a digital camera is bundled therein. The bundled device driver is installed to a personal computer.

In addition, a digital camera that has a function for recording a plurality of different format files to a record medium is known. For example, a digital camera that can record both a photographed picture (main picture) and an E-mail size picture to a record medium has been proposed. As another example, a digital camera that has a function for recording both a main picture and a voice memo to a record medium has been proposed. Hereinafter, sometimes, a main picture is referred to as main file; a file related to a main file is referred to as sub file.

When the conventional mass storage class interface is used, since a digital camera is recognized as a removable media, it is necessary for the user to manage the directory. For example, a folder "Dcim" is created in a memory card. In the folder "Dcim", a sub. folder "100 msdcf" is created. In the sub folder "100 msdcf", for example a JPEG picture file is stored. A file name of a picture file is composed of for example "dsc"+five-digit numeral+extension (that represents a picture compression format (for example, .jpg)). A digital camera has a function for creating both a still picture file and a voice memo, an E-mail picture, or the like. They are stored in other folders. Unless the user knows such a directory structure, he or she cannot easily search and operate a desired file.

In addition, in a digital camera body, a main picture and an E-mail sub file are stored in different folders. Thus, when folders, file names, and record date/time data are compared, a main picture and a sub file can be correlated. When data recorded in a record medium is transferred to a personal computer using the conventional mass storage class USB interface, the directory structure of the digital camera is transferred to the personal computer as it is. In this case, the user should search a sub file related to a main picture file using a folder name, a file name, record date/time data, and so forth. Thus, the user cannot easily know the relation of these files.

Recently, as a higher layer created corresponding to the still image class interface, PTP (Picture Transfer Protocol) has been proposed by PIMA (Photographic and Imaging Manufacturers Association, Inc.). This standard deals with a data transfer system for digital cameras and scanners. In this system, without need to consider the directory structure, the user can easily capture a picture file to a personal computer and select a desired file on the personal computer. For example, the PTP has a function for displaying a thumbnail picture for a picture file. Thus, as a USB interface for digital cameras, to allow the users to easily operate them, it is preferred to use the PTP.

However, in the PTP, data other than picture data (for example, voice data) cannot be recorded from a personal computer to a memory card of a digital camera. In contrast, data other than picture data cannot be captured to a personal computer. In addition, since the PTP is supported by new OSs (Operating Systems), not old OSs. Thus, when only the PTP is used, it is necessary to cause the old OSs to support the PTP. Thus, for example, it is necessary to originally develop device drivers for the old OSs. As a result, the cost rises.

In addition, in the PTP, a directory structure of folders recorded in a record medium cannot be transferred to a personal computer. Picture data and sub files are transferred as same type data. Thus, with data transferred corresponding to the PTP, the user cannot easily know the relation of a main picture file and a sub file.

Therefore, a first object of the present invention is to provide a digital camera that can deal with at least two USB interfaces at the minimum cost.

A second object of the present invention is to provide a digital camera and a data transferring method that use a USB interface through which picture data is transferred regardless of the directory structure of a record medium as with the PTP and that allow the user to easily know the relation of two or more related files on a personal computer.

DISCLOSURE OF THE INVENTION

To accomplish the forgoing objects, claim 1 of the present invention is a digital camera that records data of a photographed picture to a removable record medium and reads picture data from the record medium, comprising a controlling portion, an operation input portion that outputs an operation signal to the controlling portion, a buffer memory that is controlled by the controlling portion and that is read from the record medium, and a single USB controller that is controlled by the controlling portion, wherein the operation input portion selects a first USB interface or a second USB interface and selection information that represents the selected interface is stored in the controlling portion, and wherein when the controlling portion receives a transfer request from the USB controller, the controlling portion transfers data from the buffer memory to the USB controller through the first USB interface or the second USB interface corresponding to the selection information.

The hardware of the USB controller deals with a single interface. The controlling portion can deal with two types of USB interfaces. Thus, the hardware scale is not increased.

Claim 5 of the present invention is a digital camera that records data of a photographed picture to a record medium and reads picture data from the record medium, comprising a picture processing portion that processes a photographed picture, a controlling portion, an operation input portion that outputs an operation signal to the controlling portion, and a USB controller that is controlled by the controlling portion and that composes an USB interface, wherein a predetermined photographing mode that is set by the operation input portion cause a sub file related to a main file corresponding to a photographed picture to be created, wherein the controlling portion records the main file and the sub file to the record medium, and wherein when the main file and the sub file stored in the record medium is transferred through the USB interface, a folder is created in data that is transferred.

Claim 11 of the present invention is a data transferring method, comprising the steps of creating a sub file related to a main file corresponding to a photographed picture in a predetermined photographing mode, recording the main file and the sub file to the record medium, and transferring the main file and the sub file stored in the record medium to a host side through a USB interface, wherein a folder is created in the transferred data.

When data is transferred from a digital camera to a personal computer through a USB interface corresponding to for example the PTP, since a folder can be created, the use can easily know the relation of data transferred to the personal computer.

BRIEF DESCRIPTION OF DRAWINGS

FIG. 6 is a schematic diagram showing an example of a file table according to the other embodiment of the present invention;

FIG. 9 is a schematic diagram showing photographing modes and file names that are transferred according to the other embodiment of the present invention;

FIG. 10 is a schematic diagram showing a file structure transferred corresponding to the PTP according to the other embodiment of the present invention;

FIG. 11 is a schematic diagram showing a part of operations used corresponding to the PTP;

FIG. 19 is a schematic diagram showing a data structure of an object handle according to the other embodiment of the present invention;

FIG. 20 is a schematic diagram showing a data structure of object information data according to the other embodiment of the present invention;

FIG. 21 is a schematic diagram showing a data structure of object information data according to the other embodiment of the present invention.

BEST MODES FOR CARRYING OUT THE INVENTION

Figure 1:
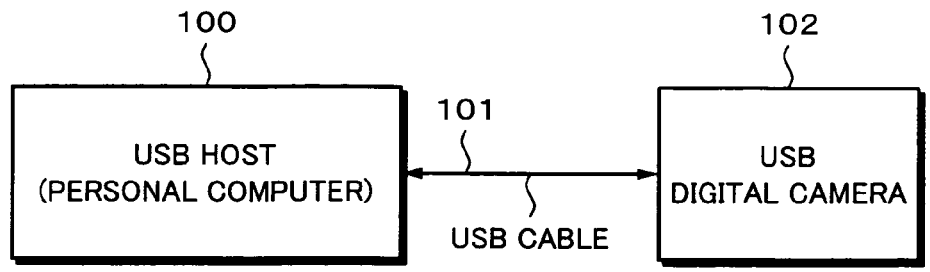
FIG. 1 is a schematic diagram showing the structure of which a digital camera is connected to a personal computer according to the present invention.

Next, an embodiment of the present invention will be described. According to the embodiment, a picture file recorded by a digital camera is transferred from the digital camera to a personal computer. In other words, as shown in FIG. 1, a USB host (personal computer) 100 and a digital camera 102 having a USB port are directly connected with a USB cable 101. A picture file recorded in a removable record medium, for example a memory card, disposed in the digital camera 102 is transferred from the digital camera 102 to the personal computer 100.

Figure 2:
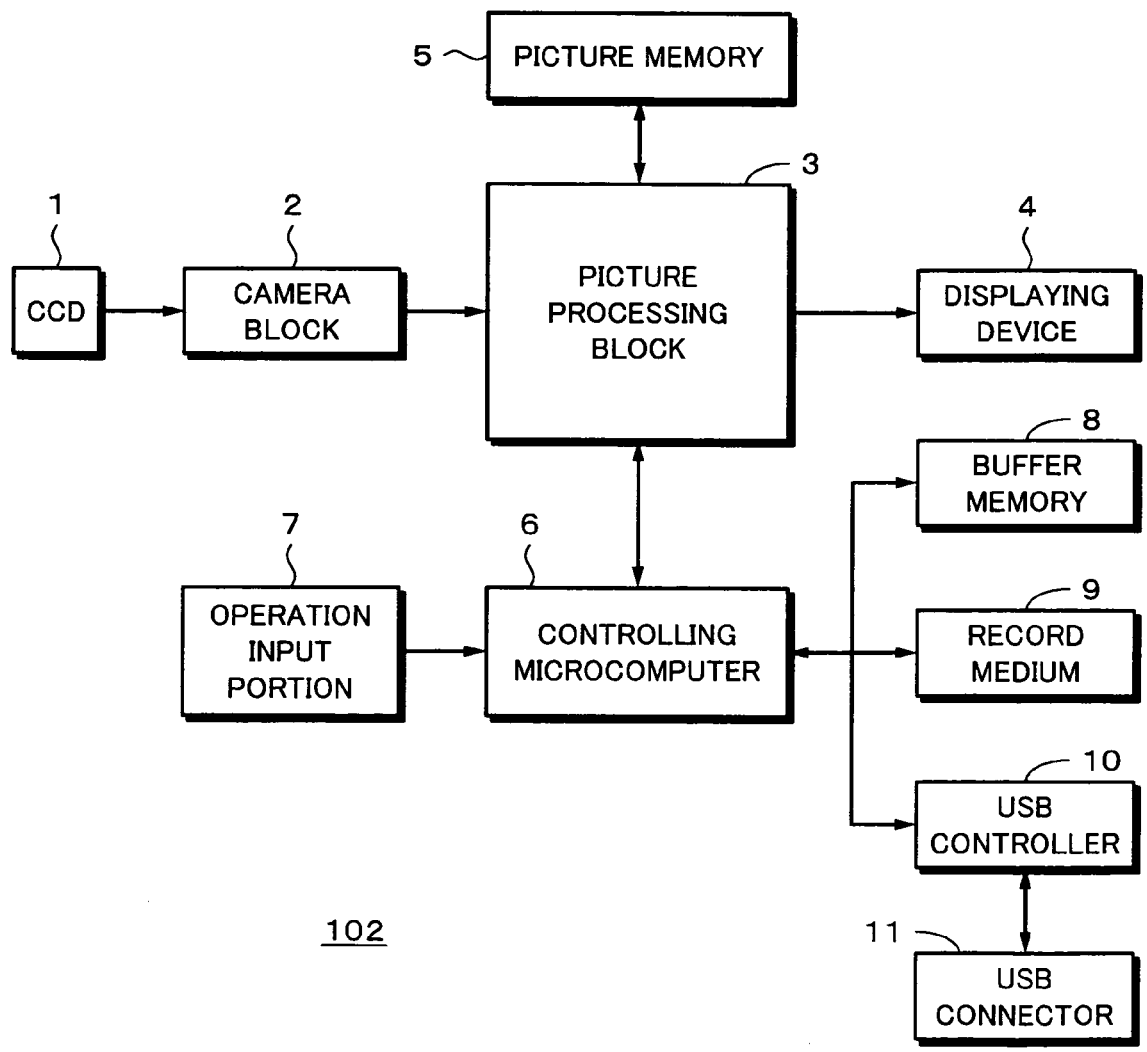
FIG. 2 is a block diagram showing the structure of a digital camera according to an embodiment of the present invention.

FIG. 2 shows the system structure of the digital camera 102. In FIG. 2, reference numeral 1 represents a CCD (Charge Coupled Device). The number of pixels (the number of horizontal pixels×the number of vertical pixels) of the CCD 1 is for example 1800×1200. The number of pixels of a recorded picture against the number of pixels of a photographed picture (color picture) can be selected from various types. The CCD 1 outputs an image of an object photographed through a lens (not shown) as a photographed picture signal. The lens portion of the CCD 1 performs an automatic diaphragm controlling operation and an automatic focus controlling operation. The photographed picture signal is supplied to a camera block 2.

The camera block 2 includes a clamping circuit, a luminance signal processing circuit, a contour compensating circuit, a defect compensating circuit, an automatic diaphragm controlling circuit, an automatic focus controlling circuit, an automatic white balance compensating circuit, and so forth. The camera block 2 generates the digital photographed picture signal as a component signal composed of a luminance signal and color difference signals converted from for example RGB signals. The digital photographed picture signal is supplied to a picture processing block 3.

The picture processing block 3 has a signal switching portion, a display buffer memory, a D/A converter, a picture data encoder, a picture data decoder, and so forth. As picture file formats, for example JPEG (Joint Photographic Experts Group), MPEG (Moving Picture Experts Group), GIF (Graphics Interchange Format), TIFF (Tagged Image File Format), BMP (Windows BitMap), and so forth can be selectively used. A displaying device 4 and a picture memory 5, for example, a DRAM (Dynamic Random Access Memory), are connected to the picture processing block 3. In the picture processing block 3, generated RGB signals are supplied to the displaying device 4 through a D/A converter. The displaying device 4 is composed of for example an LCD (Liquid Crystal Display) that is integrated with the camera.

The picture signal is supplied from the camera block 2 to the displaying device 4. The displaying device 4 displays the photographed picture. In addition, the displaying device 4 displays a picture that is read from the record medium 9 thorough a controlling microcomputer 6. Moreover, the displaying device 4 displays a menu screen for setting a mode. The record medium 9 is a removable medium, for example, a memory card, a flexible disc, or a CD-R.

A bus is connected to the controlling microcomputer 6. An operation input portion 7, a buffer memory 8, the record medium 9, and a USB controller 10 that deals with a single interface are connected to the bus. A USB connector 11 is connected to the USB controller 10. Control information is supplied from the controlling microcomputer 6 to each portion. Corresponding to the control information, each portion processes the picture data. Corresponding to the control information, data is written to and read from the picture memory 5 and the buffer memory 8. In addition, corresponding to the control information, data is written to and read from the record medium 9.

The controlling microcomputer 6 can control the USB controller 10 through two types of USB interfaces. In other words, even if the USB controller 10 as hardware deals with a single interface, by a process of the controlling microcomputer 6, data can be transferred from the buffer memory 8 to the USB controller 10 through one of the two types of USB interfaces. The two types of USB interfaces are PTP (Still Image Class) and mass storage class interface.

The operation input portion 7 has a shutter button, a mode dial for setting a mode, and various types of switches that the user operates. When the shutter button is pressed, the controlling microcomputer 6 detects this, causes the camera block 2 and the picture processing block 3 to store the photographed original picture to the picture memory 5, and causes the picture processing block 3 to compress the original picture data and record the compressed data to the record medium 9.

When the user presses an operation switch such as the mode dial of the operation input portion 7, the controlling microcomputer 6 detects this and causes the picture processing block 3 to write a pattern to the picture memory 5 and the displaying device 4 to display a menu. When the user operates operation switches such as direction keys and a confirmation key of the operation input portion 7, the displaying device 4 displays a plurality of functions that will be set and have been set. At that point, selection information corresponding to the settings that have been performed is stored in a memory of the controlling microcomputer 6.

The USB controller 10 connected to the USB connector 11 is connected to the controlling microcomputer 6 through the bus. The controlling microcomputer 6 sends and receives data to/from the USB controller 10 so as to accomplish a data transfer function with the personal computer 100 connected to the USB connector 11 through the cable 101. When data stored in the record medium 9 is transferred to the personal computer 100, the controlling microcomputer 6 receives a transfer request from the USB controller 10 and transfers data stored in the record medium 9 to the personal computer 100 corresponding to the selection information that has been set.

Figure 3A:
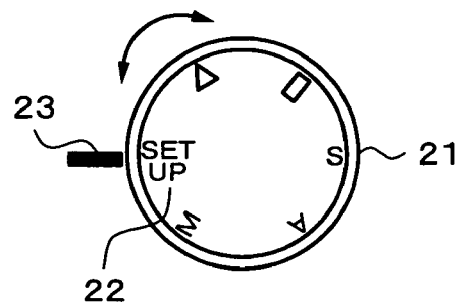
FIG. 3A is a schematic diagram showing an example of a mode dial that selects a USB interface according to the embodiment of the present invention.

Next, with reference to FIG. 3, an example of which an USB interface is set will be described. As shown in FIG. 3A, a mode dial 21 is disposed on the casing of the digital camera body. The mode dial 21 can be turned by the user. When the mode dial 21 is turned to a position "SET UP" 22 with a marker 23, the digital camera is placed in a setting mode.

Figure 3B:
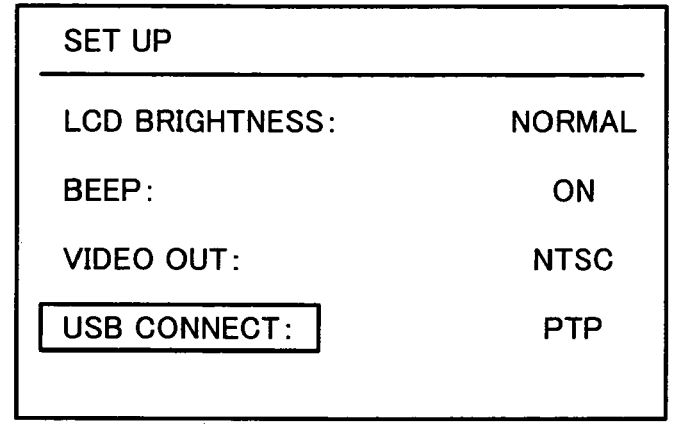
FIG. 3B is a schematic diagram showing an example of a menu for selecting a USB interface according to the embodiment of the present invention.

In the setting mode, the displaying device 4 displays a mode selection menu as shown in FIG. 3B. In the example shown in FIG. 3, the menu contains setting items "LCD BRIGHTNESS", "BEEP ON/OFF", "VIDEO OUTPUT FORMAT", and "USB INTERFACE". With direction keys (not shown), a marker (a cursor, a reverse display frame, a highlight frame, a special color frame, or the like) can be moved in up, down, left, and right directions. When a confirmation operation is performed, the selected setting item becomes valid. For example, a cross-shaped key is used as the direction keys. When the center portion of the cross-shaped key is pressed, the selected setting item becomes valid. In the example shown in FIG. 3B, "USB INTERFACE" has been selected as a setting item on the menu.

Figure 3C:
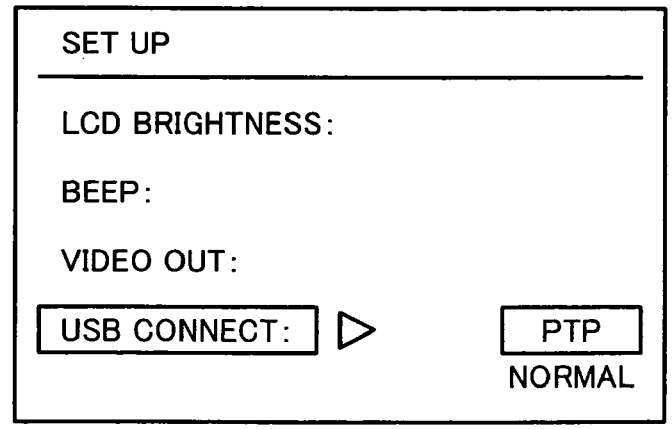
FIG. 3C is a schematic diagram showing an example of a menu after a confirmation operation is performed.

When the confirmation operation is performed in the state shown in FIG. 3B, two types of USB interfaces are displayed as shown in FIG. 3C. As one of the two types of USB interfaces, "PTP" or "NORMAL" can be selected. As was described above, "PTP" represents a USB interface standard corresponding to the still image class interface. "NORMAL" represents the mass storage class interface standard. With the direction keys and the confirmation operation, the user can decide his or her desired USB interface. Selection information corresponding to the decided USB interface is stored in the controlling microcomputer 6.

The USB interface setting method is not limited to the forgoing menu displaying method. Although the mode dial 21 is used to switch to the photographing mode or the reproducing mode, when the digital camera and the personal computer are connected through a USB interface, it is meaningless to switch to the photographing mode or the reproducing mode. Thus, in the state that the digital camera is connected to the personal computer, when the mode dial 21 is placed in the photographing mode position, one mode, for example "PTP", may be set. Likewise, when the mode dial 21 is placed in the reproducing mode position, the other mode, for example "NORMAL", may be set. Alternatively, as a default USB interface, for example "NORMAL" may be set.

Figure 4:
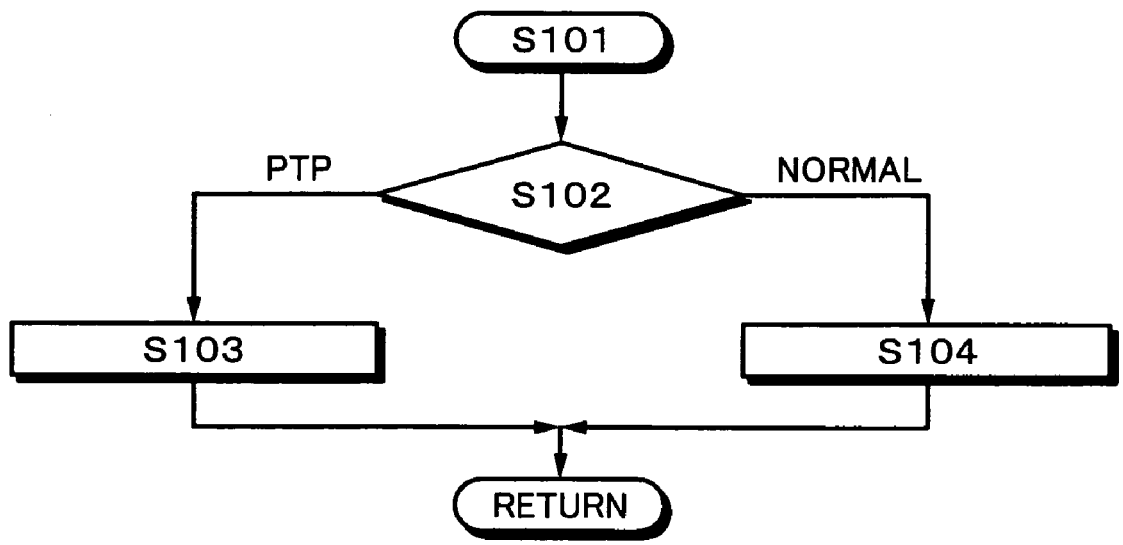
FIG. 4 is a flow chart showing a USB interface switching process.

FIG. 4 is a flow chart showing a process performed by the controlling microcomputer 6 when data stored in the record medium 9 is transferred to the personal computer. At step S101, a transfer request is sent from the USB controller 10 to the controlling microcomputer 6. At step S102, the controlling microcomputer 6 references selection information for a USB interface to the internal memory. The controlling microcomputer 6 transfers data stored in the record medium 9 to the buffer memory 8.

When the USB interface is "PTP", at step S103, using the means of "PTP", data stored in the buffer memory 8 is transferred to the USB controller 10. Likewise, when the USB interface is "NORMAL" (mass storage class interface), at step S104, using the means of "NORMAL", data stored in the buffer memory 8 is transferred to the USB controller 10. The USB controller 10 transfers the data received from the controlling microcomputer 6 to the personal computer through the USB connector 11 and the USB cable.

When the USB interface is "PTP", a directory structure of folders and so forth of the record medium 9 cannot be transferred to the personal computer. Thus, picture information is transferred regardless of types thereof. Thus, the user cannot easily know the relation of main picture information and other information.

Next, a digital camera that uses the PTP as a USB interface and that allows the user to easily recognize the relation of a plurality of related files on the personal computer will be described as another embodiment of the present invention with reference to the accompanying drawings. The connection and the structure of the digital camera according to the other embodiment are the same as those of the digital camera according to the forgoing embodiment shown in FIGS. 1 and 2.

According to the other embodiment of the present invention, a picture file recorded by a digital camera is transferred from the digital camera to a personal computer. In other words, as shown in FIG. 1, a USB host (personal computer) 100 and a digital camera 102 having a USB port are directly connected with a USB cable 101. A picture file recorded in a removable record medium, for example a memory card, disposed in the digital camera 102 is transferred from the digital camera 102 to the personal computer 100.

According to the other embodiment, corresponding to the PTP based on the still image class interface, data is transferred from the digital camera 102 to the personal computer 100. To do that, an application program corresponding to the PTP and the folder structure has been installed to the personal computer 100 (the application program may be bundled in the OS (Operating System)).

FIG. 2 shows the system structure of the digital camera 102. In FIG. 2, reference numeral 1 represents a CCD (Charge Coupled Device). The number of pixels (the number of horizontal pixels×the number of vertical pixels) of the CCD 1 is for example 1800×1200. The number of pixels of a recorded picture against the number of pixels of a photographed picture (color-picture) can be selected from various types. The CCD 1 outputs an image of an object photographed through a lens (not shown) as a photographed picture signal. The lens portion of the CCD 1 performs an automatic diaphragm controlling operation and an automatic focus controlling operation. The photographed picture signal is supplied to a camera block 2.

The camera block 2 includes a clamping circuit, a luminance signal processing circuit, a contour compensating circuit, a defect compensating circuit, an automatic diaphragm controlling circuit, an automatic focus controlling circuit, an automatic white balance compensating circuit, and so forth. The camera block 2 generates the digital photographed picture signal as a component signal composed of a luminance signal and color difference signals converted from for example RGB signals. The digital photographed picture signal is supplied to a picture processing block 3.

The picture processing block 3 has a signal switching portion, a display buffer memory, a D/A converter, a picture data encoder, a picture data decoder, and so forth. As picture file formats, for example JPEG (Joint Photographic Experts Group), MPEG (Moving Picture Experts Group), GIF (Graphics Interchange Format), TIFF (Tagged Image File Format), BMP (Windows BitMap), and so forth can be selectively used. A displaying device 4 and a picture memory 5, for example, a DRAM (Dynamic Random Access Memory), are connected to the picture processing block 3. In the picture processing block 3, generated RGB signals are supplied to the displaying device 4 through a D/A converter. The displaying device 4 is composed of for example an LCD (Liquid Crystal Display) that is integrated with the camera.

The picture signal is supplied from the camera block 2 to the displaying device 4. The displaying device 4 displays the photographed picture. In addition, the displaying device 4 displays a picture that is read from the record medium 9 thorough a controlling microcomputer 6. Moreover, the displaying device 4 displays a menu screen for setting a mode. The record medium 9 is a removable medium, for example, a memory card, a flexible disc, or a CD-R.

An operation input portion 7, a buffer memory 8, the record medium 9, and a USB controller 10 are connected to the controlling microcomputer 6. A USB connector 11 is connected to the USB controller 10. The controlling microcomputer 6 controls the USB controller 10 through a USB interface corresponding to the PTP. Control information is supplied from the controlling microcomputer 6 to each portion. Corresponding to the control information, each portion processes the picture data. Corresponding to the control information, data is written to and read from the picture memory 5 and the buffer memory 8. In addition, corresponding to the control information, data is written to and read from the record medium 9.

The operation input portion 7 has a shutter button, a mode dial for setting a mode, and various types of switches that the user operates. When the shutter button is pressed, the controlling microcomputer 6 detects this, causes the camera block 2 and the picture processing block 3 to store the photographed original picture to the picture memory 5, and causes the picture processing block 3 to compress the original picture data and record the compressed data to the record medium 9. In this case, corresponding to the record mode that has been selectively set, both a main picture and other information (referred to as sub file) are recorded to the record medium 9.

When the E-mail mode has been set, the picture processing block 3 creates an E-mail sub file that is for example a CIF (Common Intermediate Format, 320×320 pixel) format picture and that is smaller than a main picture compressed corresponding to the JPEG format. The picture processing block 3 writes the main picture and the E-mail sub file as different files to the record medium 9 at a time. In the voice memo mode, in addition to a main picture, the picture processing block 3 writes a sub file of which voice that is input from a microphone (not shown) is compressed corresponding to the MPEG format to the record medium 9.

According to the other embodiment, one of an E-mail sub file and a voice memory sub file can be created together with a main picture. The E-mail sub file has the same file name as the main picture. The e-mail sub file is stored in a folder different from folders for the main picture and the voice memo sub file. Likewise, the voice memo sub file is stored in a folder different from folders for the main picture and the E-mail sub file. The camera body assigns file numbers to main pictures. With the assigned file numbers, the camera body manages the main pictures. In addition, the camera body determines the relation of sub files and main pictures using folders, their names, record date/time data, and so forth. The camera body assigns file numbers to main pictures regardless of the file names thereof.

The USB controller 10 connected to the USB connector 11 is connected to the controlling microcomputer 6 through a bus. The controlling microcomputer 6 sends and receives data to/from the USB controller 10 so as to accomplish a data transfer function with the personal computer 100 connected to the USB connector 11 through the cable 101 corresponding to the PTP.

Figure 5:
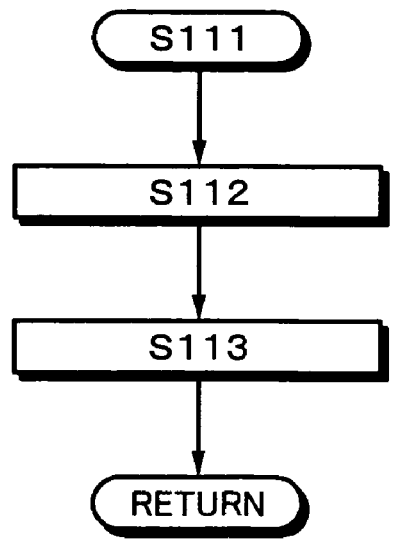
FIG. 5 is a flow chart for explaining a process for creating a file table according to another embodiment of the present invention.

FIG. 5 shows an outline of a process performed by the controlling microcomputer 6 in the case that data stored in the record medium 9 is transferred to the personal computer 100. When the controlling microcomputer 6 detects that the personal computer has been connected to the USB connector 11, at step S111, a USB connection detecting process is executed. At step S112, the controlling microcomputer 6 creates a file table for files stored in the record medium 9. The created file table is stored in the buffer memory 8.

Figure 6:
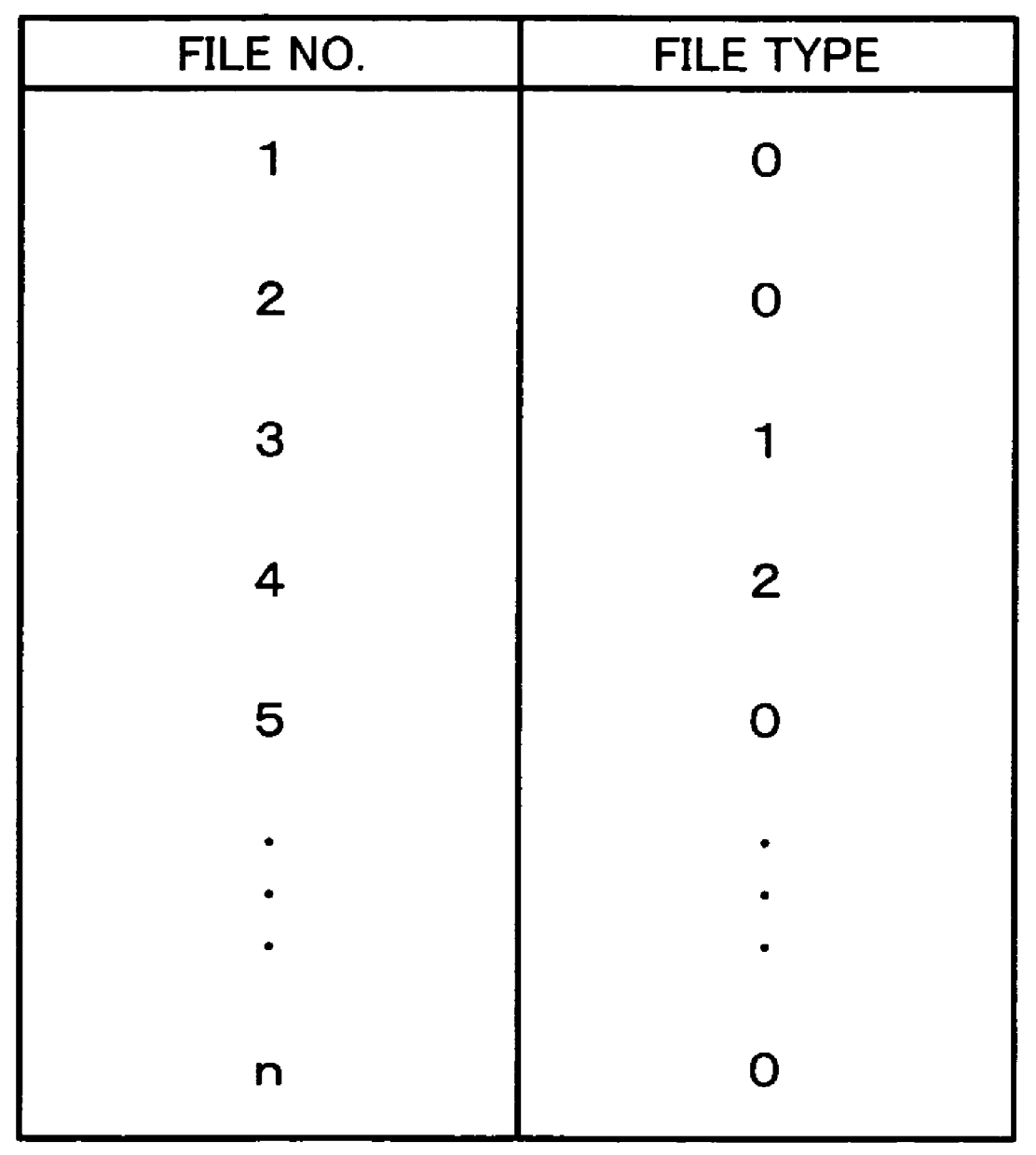

The file table contains information that represents the relation of main pictures and sub files and the types of the sub files corresponding to folders, their names, record date/time data, and so forth. FIG. 6 shows an example of the file table. In FIG. 6, file numbers identifies main pictures recorded on the record medium 9. For each main picture file identified by a file number, file type information is created. The file type information has one of three values. When the file type information is 0, it represents that no sub file is present. When the file type information is 1, it represents that an E-mail sub file is present. When the file type information is 2, it represents that a voice memo sub file is present.

The file table is not always stored. Instead, only when the digital camera and the personal computer are connected through the USB interface, the file table is created. Thus, when the digital camera and the personal computer are not connected through the USB interface, the buffer memory 8 can be effectively used. As a result, the function for the file table can be accomplished without need to increase the capacity of the buffer memory 8. When the file table is being created, the camera body cannot handle a request for a file issued from the personal computer. To solve this problem, before the camera body sends the USB connection request to the personal computer, a file table creating process is performed at step S112.

After the table creating process has been completed at step S112, the flow advances to step S113. At step S113, the USB connection request is issued to the personal computer. At that point, the personal computer recognizes the camera as a USB device and sends a transfer request to the USB controller 10. The transfer request is sent to the controlling microcomputer 6 through the USB controller 10. When the controlling microcomputer 6 receives the transfer request, the controlling microcomputer 6 transfers information about the record medium 9 and data stored therein to the buffer memory 8 corresponding to the type of the transfer request.

According to the other embodiment, when there is a sub file related to a picture file, virtual folders that the user can recognize are created corresponding to the protocol of the PTP. In other words, attribute data is added to each file so that the personal computer can recognize related two files in the same folder (the related two files are for example a main picture file and an E-mail sub file or a main picture file and a voice memo). When a folder is created, the forgoing file table is referenced.

Figure 7:
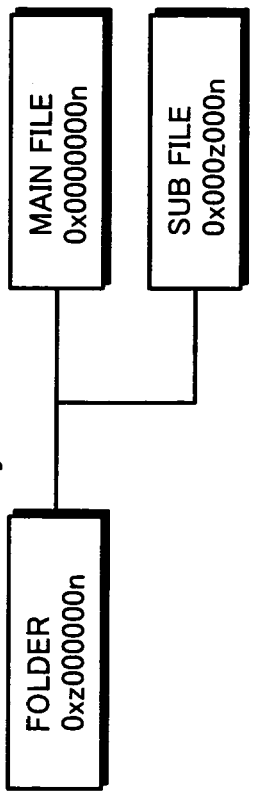
FIG. 7A is a schematic diagram showing the relation between file numbers and object handles according to the other embodiment of the present invention.
FIG. 7B is a schematic diagram showing an example of which file numbers are converted into object handles of main files, sub files, and folders according to the other embodiment of the present invention.

FIG. 7 shows an outline of such a process. The digital camera manages picture data with file numbers. Corresponding to the PTP, picture data is managed with numbers referred to as object handles. File numbers are denoted by 0x0001, 0x0002, . . . , 0x000n, . . . , 0x000m where 0x represents hexadecimal notation. File numbers are represented with two bytes each.

To transfer data to the personal computer corresponding to the PTP, a file number is converted into an object handle. In this case, as shown in FIG. 7A, when there is a sub file related to a picture file, a folder is created so that the personal computer can recognize that two files, namely the main file and the sub file, are stored in the same folder. A folder is represented by "z000" as the high order two bytes of an object handle. A main file is represented by "0000" as the high order two bytes of an object handle. A sub file is represented by "000z" as the high order two bytes of an object handle.

In this example, z represents the value of the file type of the file table created in the forgoing manner. In this example, when z=1, there is an E-mail sub file. When z=2, there is a voice memo sub file. When z=0, there is no sub file. Thus, when z=0, no folder is created.

FIG. 7B shows an example of the case that when there is a sub file related to a main file, a file number of the main file is converted into an object handle of the main file, an object handle of the sub file, and an object handle of the folder. The object handle of the folder, the object handle of the main file, and the object handle of the sub file are successively sent. By a mask process for ANDing an object handle and "0x0000FFFF", the object handle can be converted into a file number.

Figure 8:
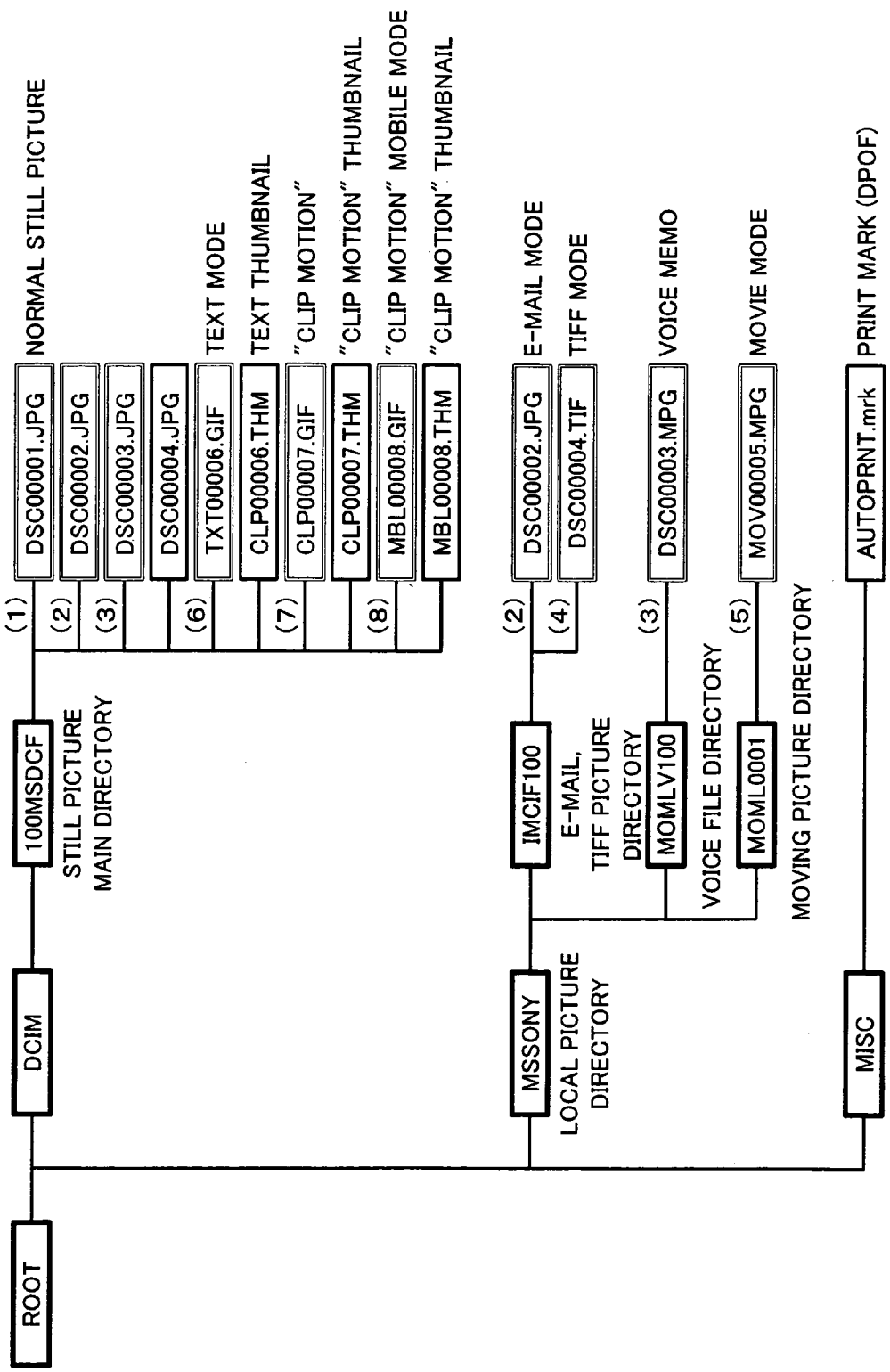
FIG. 8 is a schematic diagram showing a directory structure according to the other embodiment of the present invention.

Next, the other embodiment will be described in more detail. FIG. 8 shows the relation between a directory structure of data stored in the digital camera and a directory/file names corresponding to the PTP. In the digital camera according to the other embodiment, in a directory "DCIM", a sub directory "100MSDCF" is created. In the sub directory "100MSDCF", a main picture as a still picture is stored. A main picture file (main file) is stored in a sub directory.

In a local picture directory "MSSONY", an E-mail picture and TIFF picture sub directory "IMCIF100", a voice file sub directory "MOMLV100", and a moving picture sub directory "MOML0001" are created. In each sub directory, a sub file is stored. In addition, a directory "MISC" is created.

A directory and a sub directory correspond to a folder and a sub folder, respectively. Through the mass storage class interface, for example, the directory structure shown in FIG. 8 can be transferred to the personal computer. However, in this case, when the user does not know the directory structure, he or she cannot easily search for a desired file and recognize the relation of a main file and a sub file.

For example, files surrounded by a dual frame are selectively transferred corresponding to the PTP. Alternatively, all files can be collectively transferred to the personal computer. Numerals in parentheses represent file numbers. The digital camera manages files with file numbers. In the example shown in FIG. 8, in files transferred corresponding to the PTP, a main file "DSC00002.JPG" and a sub file (E-mail picture) "DSC00002.JPG" whose file numbers are the same are related files. In addition, a main file "DSC00003.JPG" and a sub file (voice memo) "SDC00003.MPG" are related file. In the digital camera, these files are stored in different directories (folders). Conventionally, corresponding to the PTP, these files are transferred regardless of types thereof. On the personal computer, it is necessary to recognize the relation of these files with their file names. However, according to the present invention, a virtual folder is created so that the relation of files is represented.

FIG. 9 shows file names of a main file and a sub file transferred corresponding to the PTP. Rec mode represents photographing modes that the user has set with the operation input portion 7. In a normal mode, only a main picture (main file) of a natural picture that is photographed is recorded to the record medium 9. In an E-mail mode, both a main picture and an E-mail picture (sub file) in a reduced size are recorded to the record medium 9. In a voice memo mode, both a main picture and a voice memo (sub file) that is voice data compressed corresponding to the MPEG format are recorded to the record medium 9. In addition, a TIFF format mode, a text photographing mode, and so forth can be selected.

FIG. 10 shows the structure of files transferred corresponding to the forgoing PTP. When there are both a main file and a sub file, a folder having a name corresponding to the file name is created. When the file names are "DSC0002.JPG" (the file name of a main file) and "DSCA0002.JPG" (the file name of an E-mail sub file), "DSC0002" of which extension is removed from the file names is used as the folder name. When the file names are "DSC0003.JPG" (the file name of a main file) and "DSCA0003.MPG" (the file name of a voice memo sub file), a folder "DSC00003" is created.

FIG. 11 shows part of operations prescribed in the standard for the PTP and meanings thereof. Each operation is a kind of a command sent from the personal computer to the digital camera. Each operation is a two-byte code. For example, an operation "GetObjectHandles" causes the personal computer to obtain an object handle from the digital camera. Corresponding to the PTP, before picture data is transferred from the digital camera to the personal computer, a process for obtaining device information, an object handle, and object information is required.

Figure 12:
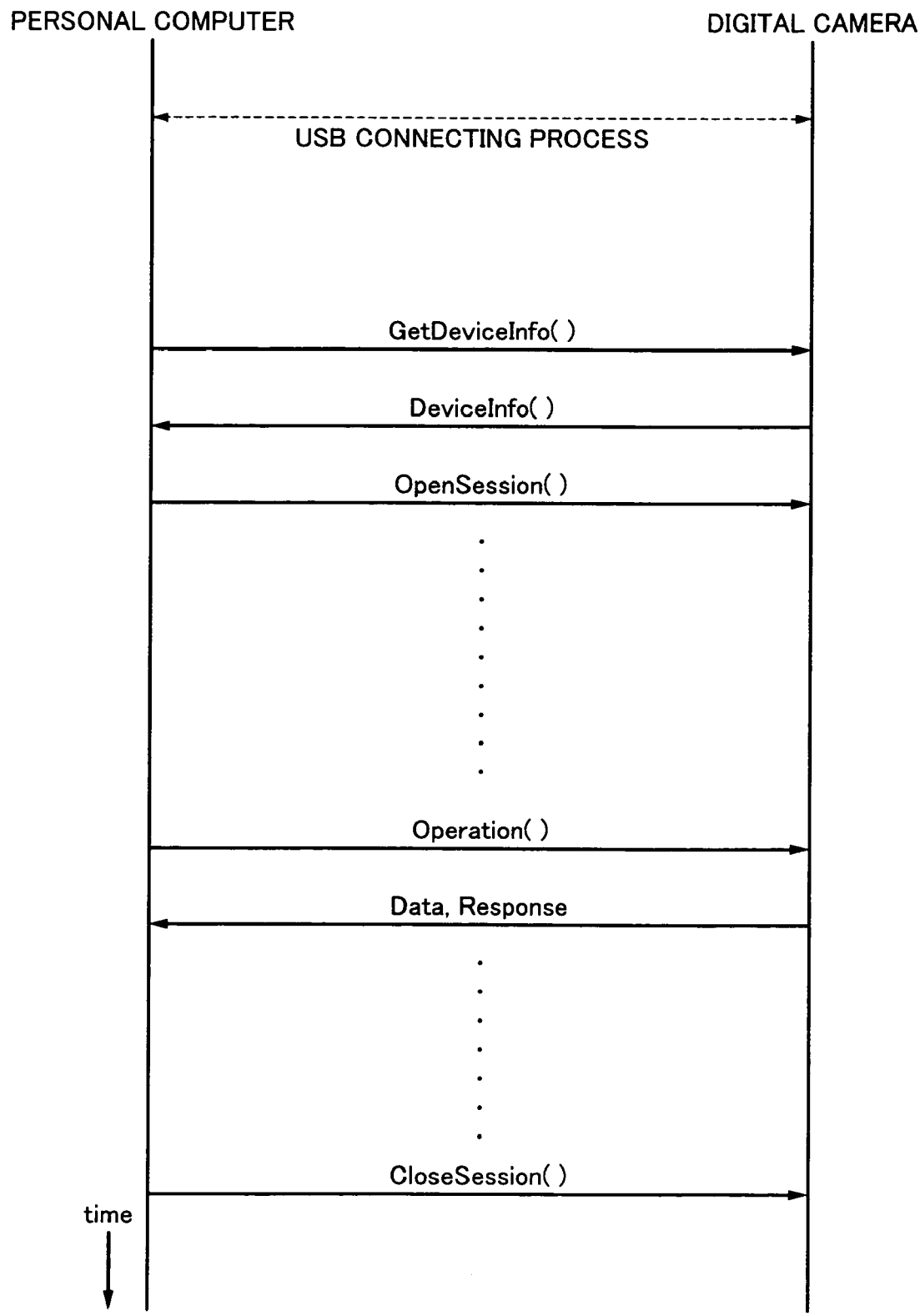
FIG. 12 is a schematic diagram for explaining operations performed when a personal computer and a digital camera are connected.

FIG. 12 shows an example in the case that the digital camera and the personal computer are connected. In this example, the personal computer is a USB host and manages the protocol. The personal computer sends an operation to the digital camera and responds to an event received from the digital camera. The digital camera responds to an operation received from the personal computer.

After the digital camera connected to the personal computer has performed a PTP initializing process, the digital camera informs the personal computer of the connection. After the personal computer has detected the connection, the personal computer performs a USB device recognizing process for the digital camera. Thereafter, the personal computer performs the PTP process. These process are represented as a USB connecting process in FIG. 12.

Thereafter, an operation "GetDeviceInfo" is sent from the personal computer to the digital camera. The operation "GetDeviceInfo" is used to obtain device (camera) information. The digital camera sends the device information to the personal computer. The device information is a corresponding operation, a corresponding event, a corresponding picture format, and so forth.

Thereafter, an operation "OpenSession" is sent from the personal computer to the digital camera. The operation "OpenSession" is used to start a session. In the operation "OpenSession", a session ID is issued. Thereafter, the operation is sent from the personal computer to the digital camera. The digital camera sends data and a response corresponding to the received operation to the personal computer. After the personal computer has completed the PTP process, the personal computer sends an operation "CloseSession" to the digital camera. Thereafter, the session is completed.

Figure 13:
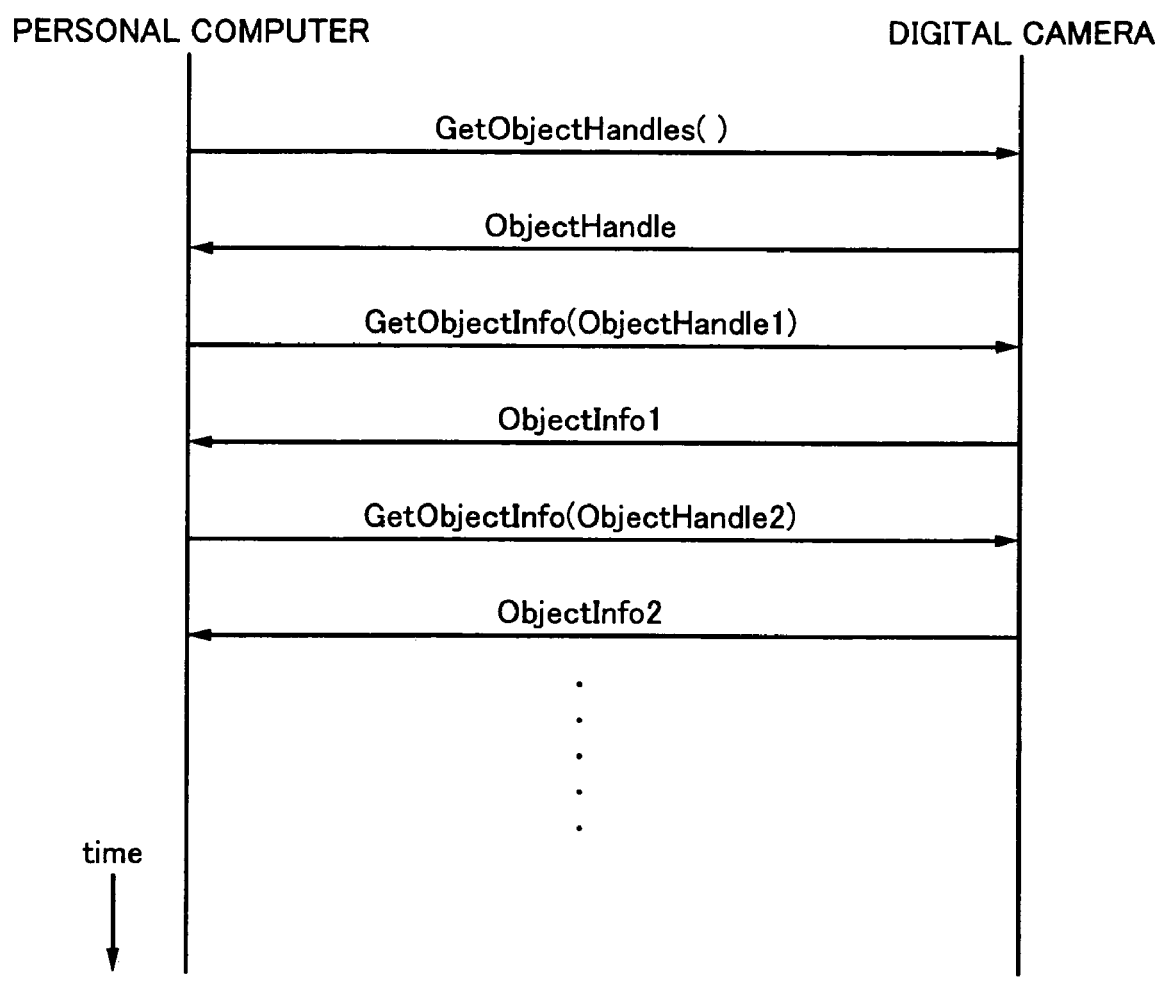
FIG. 13 is a schematic diagram for explaining operations for GetObjectHandle.

FIG. 13 shows an example of a connecting operation. An operation "GetObjectHandles" is sent from the personal computer to the digital camera. The operation "GetObjectHandles" is used to obtain a picture file number. The digital camera sends object handles for all objects in the record medium 9 to the personal computer. Objects are picture files reproduced by the camera. Thereafter, the personal computer issues an operation "GetObjectInfo" for each object. The digital camera returns file information (ObjectInfo) of the requested object to the personal computer.

An object handle corresponds to a file number that the digital camera handles. However, the PTP does not have a concept of a sub file. Thus, it is necessary to create an object handle of a sub file. When there is a sub file, an object handle for a folder is also created.

A file number is two-byte data, whereas an object handle is four-byte data. Thus, as was described with reference to FIG. 7, the low order two bytes of an object handle is used as a file number. Thus, when an object handle is masked with 0x0000FFFF, the object handle can be easily converted into a file number. A folder and a sub file can be distinguished with high order two bytes of their object handles. When an object handle is masked with 0xF0000000 and the masked digit is not 0, it is determined that the object handle is a folder. When an object handle is masked with 0x000F0000 and the masked digit is not 0, it is determined that the object handle is a sub file. For file types, for example, an E-mail sub file and a voice memo sub files are assigned 1 and 2, respectively. With reference to the file table, these object handles are created. An object handle of a folder, an object handle of a main picture, and an object handle of a sub file are successively sent to the personal computer.

When an operation "GetObjectInfo" is sent to the digital camera, file information (ObjectInfo) of the designated object handle is sent to the personal computer. When an object handle is a folder, the object handle can be masked with 0xF000000. In this case, the file name (folder name) without the extension and the file date/time information are sent to the personal computer.

When an object handle is a sub file, the object handle can be masked with 0x000F0000. In this case, a parent folder (parent object) is designated. When the parent object is contained in the object information, a folder as the parent can be designated. As a result, the personal computer recognizes that the picture is stored in the folder. The parent object is attribute data. To easily distinguish a parent object from a main picture, the parent object is treated as an object that does not have a thumbnail or substituted for an icon that the camera has. When the file name of a parent object is the same as the file name of a main picture, a part of the file name is changed so that the file name of the parent object is different from the file name of the main picture.

Except for the above case, a main picture (main file) is designated. At that point, it is determined whether or not there is a sub file. When there is a sub file, a parent folder (parent object) is designated.

Figure 14:
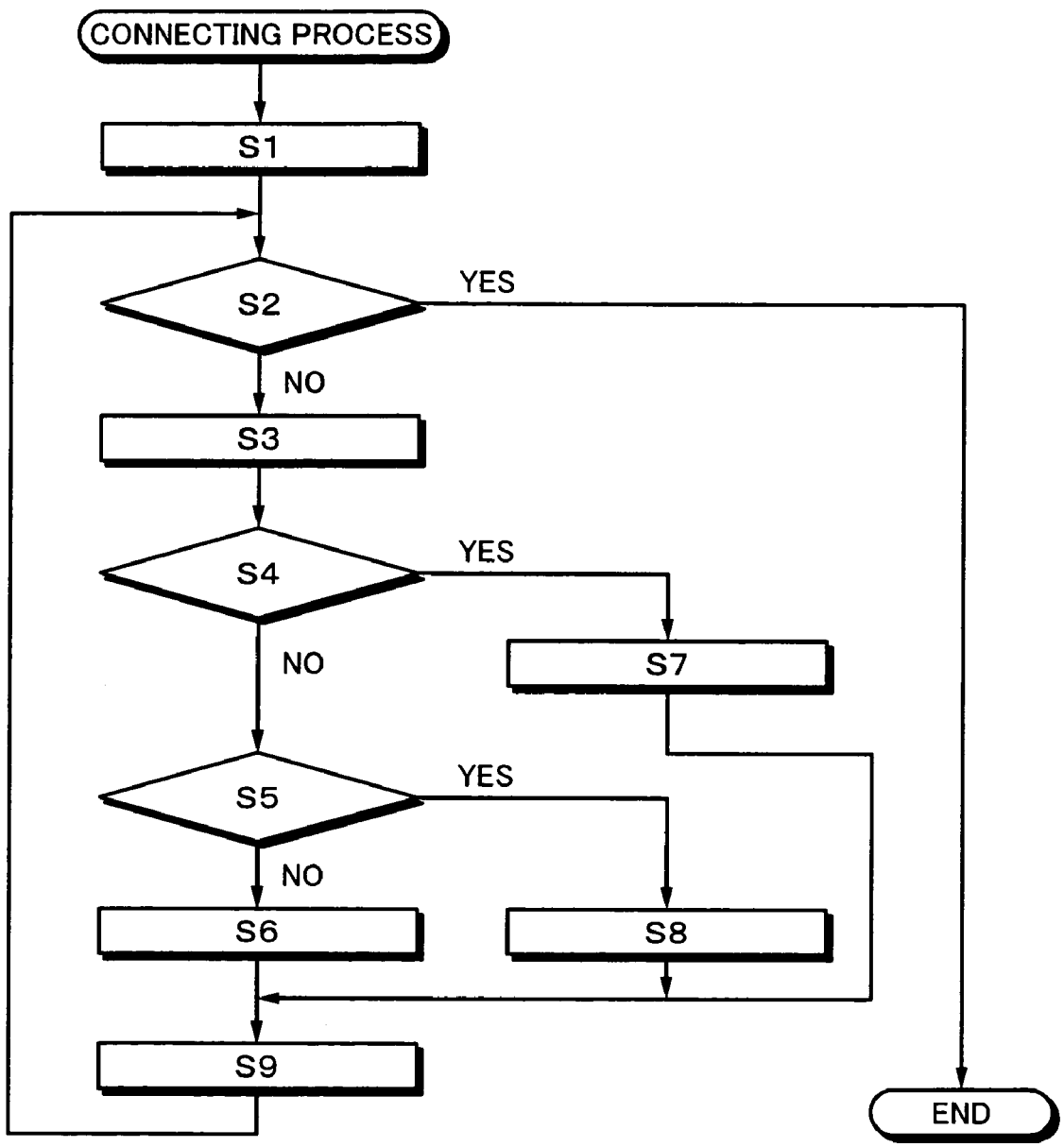
FIG. 14 is a flow chart showing a connection process (PTP initializing process) according to the other embodiment of the present invention.

Next, a process corresponding to the PTP will be described in detail. FIG. 14 is a flow chart showing a PTP initializing process. At step S1, an initial value (1) is set to variable i. At step S2, it is determined whether or not i is the maximum file number. When i is larger than the maximum file number, the process is completed. Otherwise, the flow advances at step S3. At step S3, file information of the file number i is obtained.

At step S4, it is determined whether or not the file is an E-mail sub file. When the file is an E-mail sub file, the flow advances to step S7. At step S7, array [i]=1 is set. When the file is not an E-mail sub file, the flow advances to step S5. At step S5, it is determined whether or not the file is a voice memo sub file. When the file is a voice memo sub file, the flow advances to step S8. At step S8, array [i]=2 is set. When the determined result at step S5 is No, it is clear that the file of the file number i is neither an E-mail sub file, nor a voice memo sub file. In this case, the flow advances to step S6. At step S6, array [i]=0 is set.

The initializing process is equivalent to the file table creating process that has been described with reference to FIGS. 5 and 6. At step S9, variable i is incremented by 1. Thereafter, the flow returns to step S2.

Figure 15:
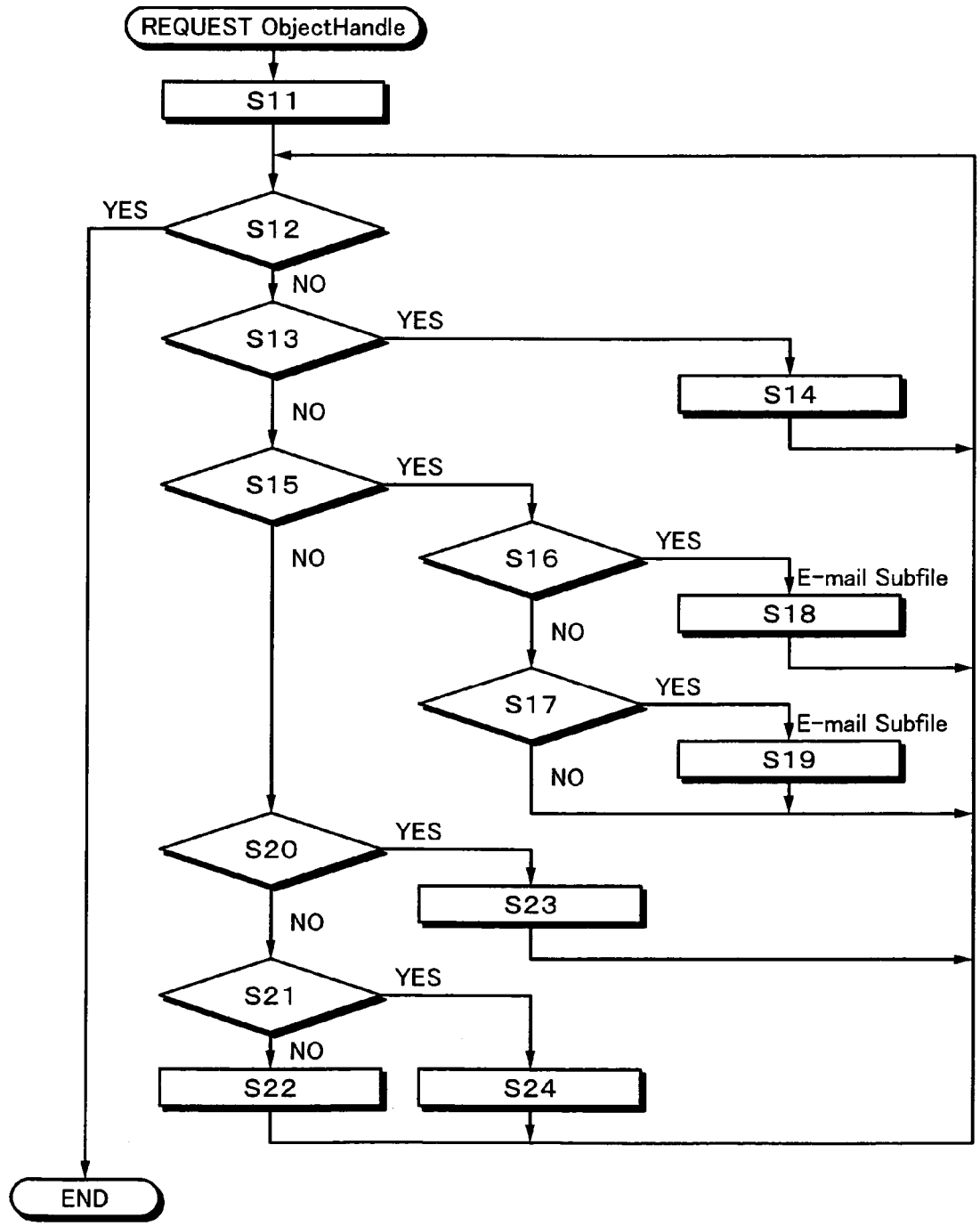
FIG. 15 is a flow chart showing "GetObjectHandle" process (operation process) according to the other embodiment of the present invention.

FIG. 15 is a flow chart showing a process corresponding the operation "GetObjectHandle". At step S11 shown in FIG. 15, initial value (1) is set to variable i. At step S12, i is compared with the maximum value of the file numbers. When variable i is larger than the maximum file number, the process is completed. When variable i is equal to or smaller than the maximum file number, the flow advances to step S13. At step S13, it is determined whether or not sendSubReq is 2. When sendSubReq is 2, the flow advances to step S14. At step S14, objecthandle=1 is set. Thereafter, the flow returns to step S12. sendSubReq is a temporary variable that stores object handles having the same file number that are successively sent. When this process is executed, the initial value of sendSubReq is 0.

When the determined result at step S13 represents that sendSubReq is not 2, the flow advances to step S15. At step S15, it is determined whether or not sendSubReq is 1. When sendSubReq is 1, the flow advances to step S16. At step S16, it is determined whether or not array [i]=1. When array [i]=1, the flow advances to step S18. At step S18, object handle=0x00010000+i and [sendSubReq=0] are set. Thereafter, the flow returns to step S12. As a result, the object handle is an E-mail sub file. "+i" represents an operation for adding the file number to the object handle.

When the determined result at step S16 represents that array [i] is not 1, the flow advances to step S17. At step S17, it is determined whether or not array [i]=2. When array [i]=2, the flow advances to step S19. At step S19, object handle=0x00020000+i and [sendSubReq=0] are set. Thereafter, the flow returns to step S12. As a result, the object handle is a voice memo sub file. When the determined result at step S17 represents that array [i] is not 2, the flow also returns to step S12.

When the determined result at step S15 represents that sendSubReq is not 1, the flow advances to step S20. At step S20, it is determined whether or not array [i]=1. When array [i]=1, the flow advances to step S23. At step S23, object handle=0x100000000+i and [sendSubReq=2] are set. Thereafter, the flow returns to step S12. As a result, the object handle is an E-mail folder.

When the determined result at step S20 represents that array [i] is not 1, the flow advances to step S21. At step S21, it is determined whether or not array [i] is 2. When array [i]=2, the flow advances to step S24. At step S24, object handle=0x20000000+i and [sendSubReq=2] are set. Thereafter, the flow returns to step S12. As a result, the object handle is a voice memo folder. When the determined result at step S21 represents that array [i] is not 2, the flow advances to step S22. At step S22, object handle=1 is set. Thereafter, the flow returns to step S12.

Figure 16:
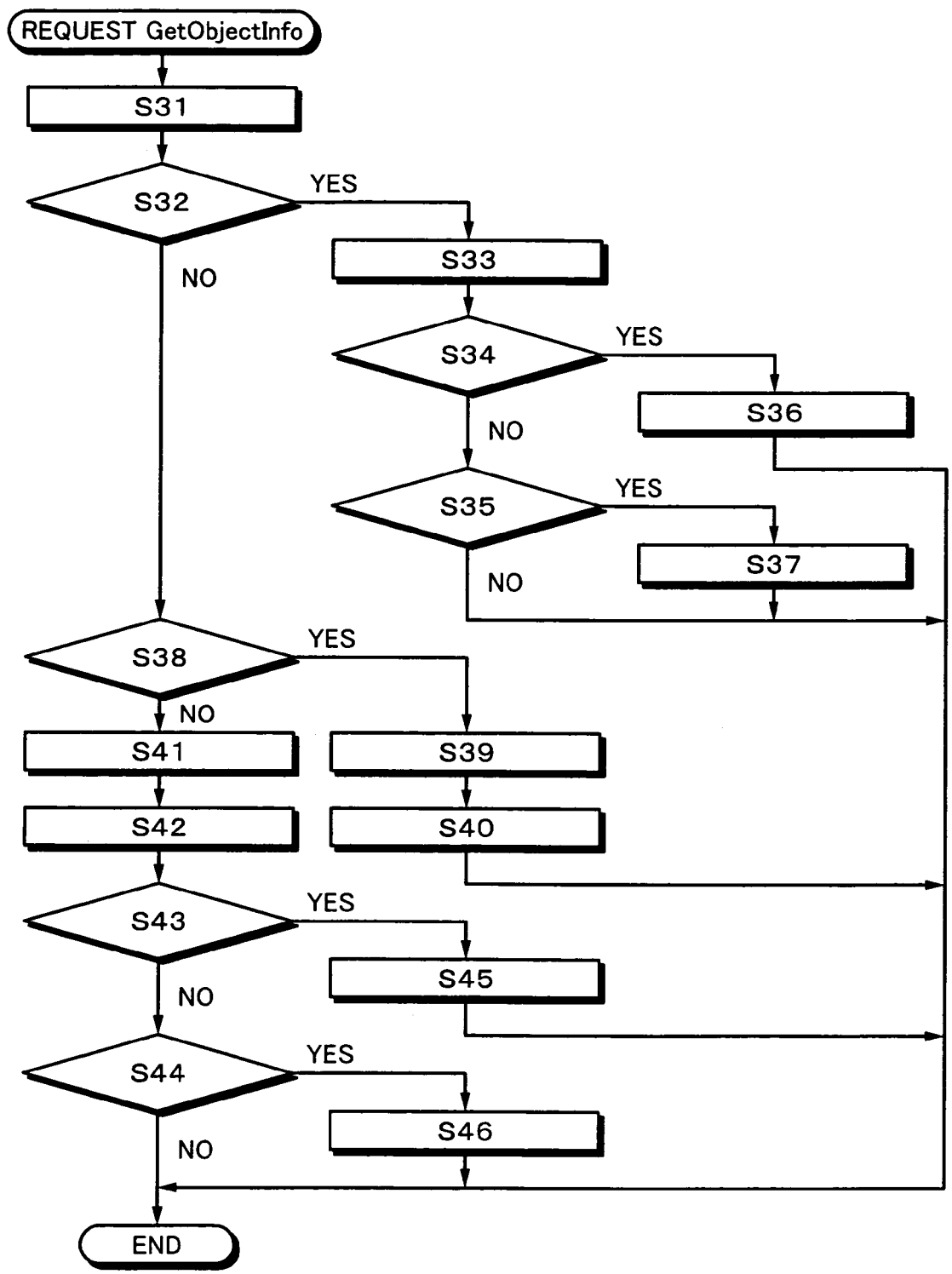
FIG. 16 is a flow chart showing "GetObjectInfo" process according to the other embodiment of the present invention.

FIG. 16 is a flow chart showing a process corresponding to the operation "GetObjectInfo". At step S31 shown in FIG. 16, the object handle is masked with 0x0000FFF (AND process). As a result, a file number is designated. At step S32, the object handle is masked with 0x000F0000. When the result at step S32 is not 0, the object handle is a sub file.

When the determined result at step S32 represents that the object handle is a sub file, the flow advances to step S33. At step S33, sub file information is obtained. At step S34, the object handle is masked with 0x00010000. When the result at step S34 is 1, it is determined that the sub file is an E-mail sub file. In this case, the flow advances to step S36. At step S36, E-mail data is set. In other words, in this case, to easily distinguish the sub file from a main file, the sub file is treated as a sub file that does not have a thumbnail. In addition, a parent folder (parent object) is designated. The parent object is designated by 0x10000000+file number. The process is completed.

When the determined result at step S34 represents that the sub file is not an E-mail sub file, the flow advances to step S35. At step S35, the object handle is masked with 0x00020000. When the result at step S35 is 2, it is determined that the sub file is a voice memo sub file. In this case, the flow advances to step S37. At step S37, voice memo data is set. In other words, in this case, the sub file is treated as a sub file that does not have a thumbnail. In addition, a parent folder (parent object) is designated. The parent object is designated by 0x20000000+file number. The process is completed. When the determined result at step S35 represents that the sub file is not a voice memo file, the process is also completed.

When the determined result at step S32 represents that the object handle is not a sub file, the flow advances to step S38. At step S38, the object handle is masked with 0xF0000000. When the result at step S38 is not 0, it is determined that the object handle is a folder. When the determined result at step S38 represents that the object handle is a folder, the flow advances to step S39. At step S39, file information is obtained. At step S40, folder data is set. In this case, the file name without the extension (folder name) and the file date/time information are sent to the personal computer. When ObjectFormat=0x3001, it represents that the object is a folder. When associateionType=1, it represents that a file can be stored as a conventional folder.

When the determined result at step S38 represents that the object handle is not a folder, the object handle is a main picture (main file). At step S41, file information is obtained. At step S42, main picture data is set. At step S43, it is determined whether or not there is an E-mail sub file. At step S44, it is determined whether or not there is a voice memo sub file. When this is one of these sub files, a parent folder (parent object) is designated (at steps S45 and S46).

Figure 17:
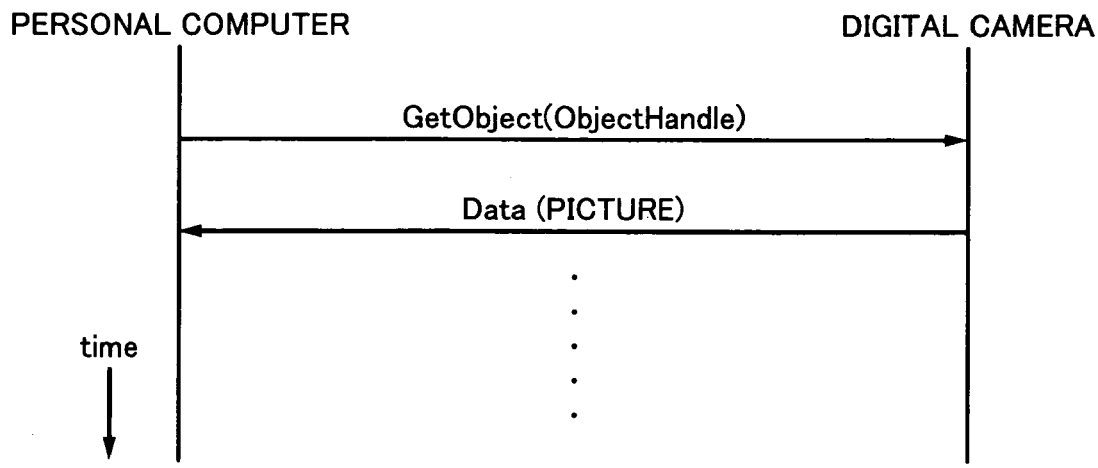
FIG. 17 is a schematic diagram for explaining operations for GetObject.

FIG. 17 is an example of a connection of the personal computer and the digital camera in the case that the former captures picture data from the latter corresponding to the PTP. The personal computer issues an operation "GetObject" with an argument as an object handle corresponding to an object. The digital camera returns data (picture) of the requested object to the personal computer.

Figure 18:
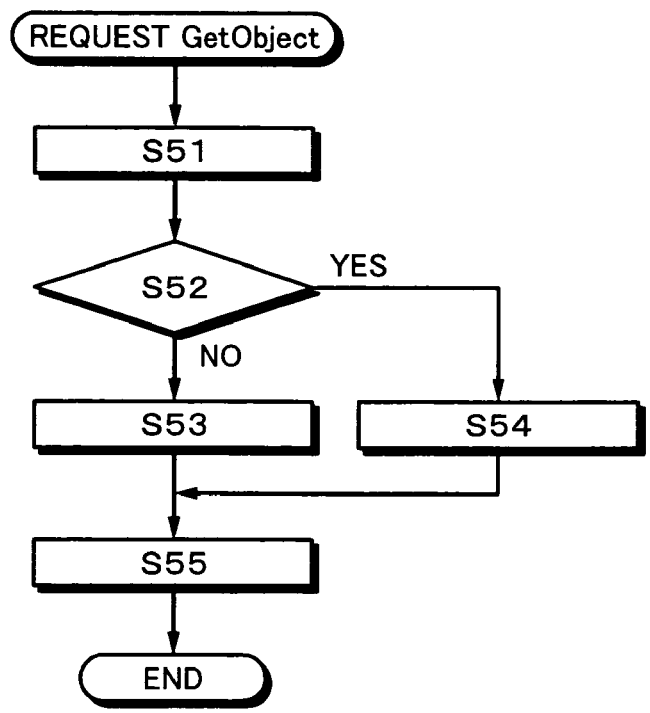
FIG. 18 is a flow chart showing "GetObject" process according to the other embodiment of the present invention.

FIG. 18 is a flow chart showing a picture capturing operation. At step S51, an object handle is masked with 0x0000FFFF (AND process). As a result, a file number is designated. At step S52, the object handle is masked with 0x000f0000. When the result at step S52 is not 0, the object handle is a sub file.

When the determined result at step S52 represents that the object handle is a sub file, the flow advances to step S54. At step S54, a flag that represents whether or not there is a sub file is set to 1. The flag is a temporary variable. In contrast, when the determined result at step S52 represents the object handle is not a sub file, the flow advances to step S53. At step S53, the flag is set to 0. At step S55, with reference to the file number and the flag, a file is captured.

FIG. 19 shows data structure of object handles obtained by an operation "GetObjectHandle". Data of the object handle is successively assigned byte numbers 0, 1, 2, . . . . The data contains information that represents the total number of object handles. The total number of object handles is a total of the number of picture files recorded in a record medium of the digital camera and the number of created folders. After byte number 16, object handles (four-byte numbers) are arranged.

FIGS. 20 and 21 show the data structure of object information corresponding to one object handle obtained by an operation "GetObjectInfo". The drawings shown in FIGS. 20 and 21 are two parts into which one drawing is divided due to a limited drawing space. The object information contains file name, photographed date and time, storage ID, picture size, protect state, thumbnail presence/absence, number of pixels of picture/thumbnail, and so forth. To cause an object handle to be recognized as a folder, ObjectFormat=0x3001, ThumbFormat=0x0000, and AssociationType=0x0001 are set. To cause an object handle to be recognized as a file stored in a folder, parentobject=folder is set.

Figure 22:
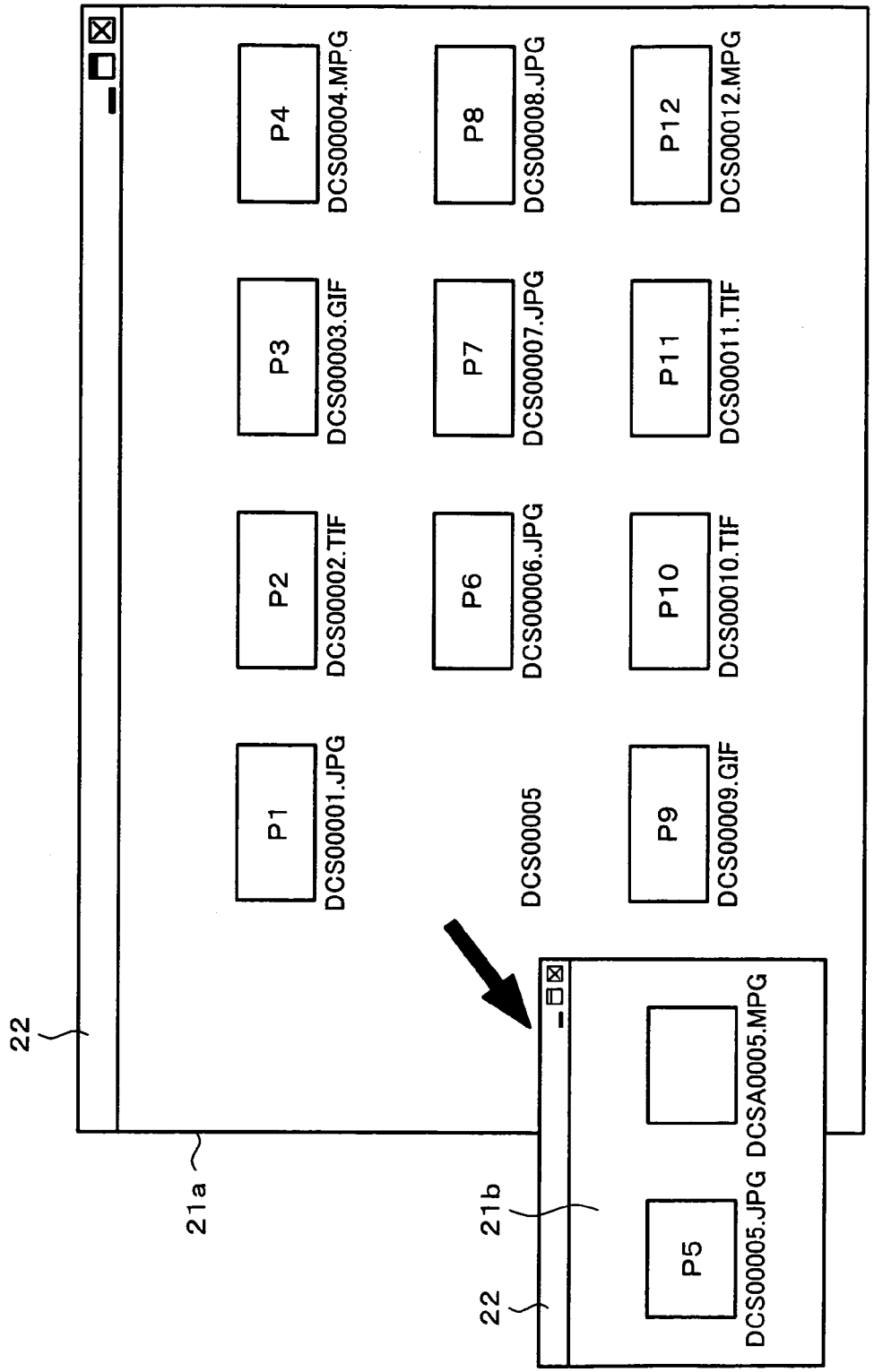
FIG. 22 is a schematic diagram showing a list of data transferred to a personal computer according to the other embodiment of the present invention.

Corresponding to the forgoing PTP, files stored in a record medium disposed in the digital camera are transferred to the personal computer. As shown in FIG. 22, on a screen 21a having a title bar 22, a list of thumbnails P1, P2, . . . of main pictures can be displayed. In reality, various types of data such as a picture process menu are displayed. However, for simplicity, they are omitted on the screen shown in FIG. 22. When a folder stores a main file and a sub file, a thumbnail of the folder is not displayed. In this case, only the folder name is displayed. Alternatively, any icon that represents the folder may be displayed. When the user clicks a folder name or an area thereof, a thumbnail P5 of a main picture and a sub file are displayed as a screen 21b. In the example shown in FIG. 22, since the sub file is a voice memo sub file, a thumbnail thereof is not displayed on the screen 21b. Only a file name is displayed on the screen 21b.

The present invention is not limited to the forgoing embodiments. Without departing from the sprit of the present invention, various ramifications and modifications are available. For example, sub files can be stored in folders corresponding to the types of sub files. In addition, two or more types of USB interfaces can be provided. The user can selectively set one of them. In this case, even if the USB controller as hardware deals with only one interface, corresponding to a process of the controlling microcomputer, data can be transferred from the buffer memory to the USB controller through one of the two types of USB interfaces. The two types of USB interfaces are for example the PTP (still image class) and the mass storage class interface.

In addition, in the other embodiment of the present invention, for example, the USB controller 10 may be built in the controlling microcomputer 6. In addition, the number of types of USB interfaces is not limited to two. Three or more types or USB interfaces may be used.

For example, sub files can be stored in folders corresponding to the types of sub files. In addition, two or more types of USB interfaces can be provided. The user can selectively set one of them. In this case, even if the USB controller as hardware deals with only one interface, corresponding to a process of the controlling microcomputer, data can be transferred from the buffer memory to the USB controller through one of the two types of USB interfaces. The two types of USB interfaces are for example the PTP (still image class) and the mass storage class interface.

According to the present invention, since the USB interface switching means is used, the USB controller that deals with a single USB interface can accomplish a multiple USB interface function. Thus, although the USB controller is structured at relatively low cost in relatively small circuit scale, a plurality of types of interfaces or a plurality of circuit scales can be accomplished. In other words, it is not necessary to provide individual USB controllers corresponding to individual USB interfaces. In addition, when the user selectively uses functions of USB classes, a digital camera that have their advantages can be accomplished.

In addition, according to the present invention, when a digital camera is connected to a personal computer that has an USB interface corresponding to for example the PTP and in which an application program corresponding to a folder structure has been installed (the application program may be bundled in the OS) and a file is transferred from the digital camera to the personal computer, a folder with which the personal computer can deal is created. As a result, the relation of files transferred to the personal computer can be easily recognized. When there is a sub file related to a picture, a folder is displayed at the position of the picture. When the folder is opened, since it looks as if a plurality of related files are contained in the folder, the relation of the files can be easily recognized.

The invention claimed is:

1. A digital camera that records data of a photographed picture to a removable record medium and reads picture data from the record medium, comprising:
   a controlling portion;
   an operation input portion that outputs an operation signal to the controlling portion;
   a buffer memory that is controlled by the controlling portion and that is read from the record medium; and
   a single USB controller that is controlled by the controlling portion,
   wherein the operation input portion selects a first USB interface or a second USB interface and selection information that corresponds to the selected USB interface is stored in the controlling portion,
   wherein when the controlling portion receives a transfer request from the USB controller, the controlling portion transfers data from the buffer memory to the USB controller through the selected USB interface corresponding to the selection information; and
   wherein when the second USB interface is selected the controlling portion does not transfer a directory structure of the record medium,
   wherein the control portion creates an object handle for each file transferred from the recording medium according to a file name of the file and a type of the file, a predetermined number of high order bytes of the object handle indicating types of the file,
   wherein a relationship among files recorded in separate folders in the record medium is determined independent of a directory structure, and
   wherein when the relationship among the files is determined, an associated virtual folder is generated for storing related files, an object handle of the associated virtual folder being determined by a combination of object handles of the related files and a hexadecimal notation, the object handle indicating a type of a sub file included in the associated virtual folder.

2. The digital camera as set forth in claim 1, wherein the first USB interface and the second USB interface correspond to a mass storage class interface and a still image class interface, respectively.

3. The digital camera as set forth in claim 1, further comprising:
   a displaying device,
   wherein the displaying device displays a USB interface selecting menu screen corresponding to an operation of the operation input portion, and
   wherein one of the USB interfaces can be selected on the menu screen.

4. The digital camera as set forth in claim 1,
wherein a mode selection switch that selects a photographing mode for recording a photographed picture to the record medium or a reproducing mode for reading data from the record medium is also used to select one of the USB interfaces.

5. A digital camera that records data of a photographed picture to a record medium and reads picture data from the record medium, comprising:
a picture processing portion that processes a photographed picture;
a controlling portion;
an operation input portion that outputs an operation signal to the controlling portion; and
a USB controller that is controlled by the controlling portion and that composes an USB interface,
wherein a predetermined photographing mode that is set by the operation input portion causes a sub file related to a main file corresponding to a photographed picture to be created,
wherein the controlling portion records the main file and the sub file to the record medium,
wherein the control portion creates an object handle for each file transferred from the recording medium according to a file name of the file and a type of the file, a predetermined number of high order bytes of the object handle indicating types of the file,
wherein when the main file and the sub file stored in the record medium are transferred through the USB interface, associated virtual folder is created in data that is transferred, an object handle of the associated virtual folder being determined by a combination of object handles of the related files and a hexadecimal notation, the object handle indicating a type of the sub file included in the associated virtual folder, and
wherein a relationship among files recorded in separate folders in the record medium is determined independent of a directory structure.

6. The digital camera as set forth in claim 5, wherein attribute data that allows a host side to recognize that related main file and sub file are stored in the folder is added to the main file and the sub file.

7. The digital camera as set forth in claim 5, wherein the folder is created for each type of the sub file.

8. The digital camera as set forth in claim 5, wherein the sub file is picture data whose size is smaller than the main file.

9. The digital camera as set forth in claim 5, further comprising:
voice input means,
wherein a voice file of which voice that had been input from the voice input means has been processed is created as the sub file.

10. The digital camera as set forth in claim 5, wherein the USB interface is an interface corresponding to PTP based on a still image class interface.

11. A data transferring method, comprising the steps of:
creating a sub file related to a main file corresponding to a photographed picture in a predetermined photographing mode;
recording the main file and the sub file to the record medium;
creating a file table containing information representing the relation of the main file and the sub file when connected to a host side through a USB interface;
transferring the main file and the sub file stored in the record medium to the host side through the USB interface;
creating an object handle for each file transferred from the recording medium according to a file name of the file and a type of the file, a predetermined number of high order bytes of the object handle indicating types of the file;
determining a relationship among files recorded in separate folders in the record medium independent of a directory structure,
wherein when the relationship among the files is determined, generating an associated virtual folder for storing related files, an object handle of the associated virtual folder being determined by a combination of object handles of the related files and a hexadecimal notation, the object handle indicating a type of the sub file included in the associated virtual folder.

12. The data transferring method as set forth in claim 11, further comprising the step of:
adding attribute data that allows the host side to recognize that related main file and sub file are stored in the folder to the main file and the sub file.

13. The data transferring method as set forth in claim 11, wherein the folder is created for each type of the sub file.

14. The data transferring method as set forth in claim 11, wherein the sub file is picture data whose size is smaller than the main file.

15. The data transferring method as set forth in claim 11, wherein a voice file is created as the sub file.

16. The data transferring method as set forth in claim 11, wherein the USB interface is an interface corresponding to PTP based on a still image class interface.

* * * * *